United States Patent [19]

Streich

[11] 4,262,702
[45] Apr. 21, 1981

[54] CONDUCTOR PIPE PLUG

[75] Inventor: Steven G. Streich, Duncan, Okla.

[73] Assignee: Halliburton Company, Duncan, Okla.

[21] Appl. No.: 105,458

[22] Filed: Dec. 20, 1979

[51] Int. Cl.³ .................. F16L 55/12; F16L 55/10
[52] U.S. Cl. .................................. 138/89; 405/203;
    405/195; 166/188; 166/192
[58] Field of Search .................. 138/89, 94; 405/169,
    405/224, 227, 203, 195; 166/181, 192, 135, 188

[56] References Cited

U.S. PATENT DOCUMENTS

| | | | |
|---|---|---|---|
| 2,776,015 | 1/1957 | Bielstein | 138/89 |
| 3,042,116 | 7/1962 | Sharp et al. | 138/89 X |
| 3,353,566 | 11/1967 | Cepkauskas et al. | 138/89 |
| 4,160,612 | 7/1979 | Britton et al. | 138/89 X |
| 4,178,967 | 12/1979 | Streich | 138/89 |
| 4,184,515 | 1/1980 | Streich et al. | 138/89 |
| 4,215,951 | 8/1980 | Knox | 138/89 X |

Primary Examiner—James E. Bryant, III
Attorney, Agent, or Firm—John H. Tregoning; James R. Duzan

[57] ABSTRACT

A plug comprising an easily releasable plug body having either a compression set type packer member, cup type sealing member or inflatable packer member, having locking dogs thereon, having sleeve type releasor abutting the locking dogs, having pressure equalization plugger abutting the sleeve type releasor and a plug body housing.

31 Claims, 6 Drawing Figures

CONDUCTOR PIPE PLUG

This invention relates to a reusable plug for sealing hollow cylindrical members, in particular the jacket legs, conductor pipes or other hollow cylindrical members of an offshore platform.

Typically, when constructed, an offshore platform has the jacket legs and conductor pipes sealed to prevent water leakage therein to facilitate towing operations and platform erection. With the jacket legs and conductor pipes sealed against water leakage, the offshore platform may either be directly towed to the desired erection site or placed on barges to be towed to the erection site. After being towed or shipped by means of towed barges to the erection site, the offshore platform is positioned on the sea bottom by the controlled flooding of one or more of the jacket legs.

However, during such flooding of the platform legs to position the platform on the seal bottom, the conductor pipes remain sealed. In such cases, since the offshore platform may be 1,000 feet tall or more, the means sealing the conductor pipe must be capable of withstanding large hydrostatic fluid pressures thereacross when the offshore platform is installed in position.

One type of plug used to seal the jacket legs and conductor pipes of offshore platforms is a steel cup retained within a cylindrical housing the same diameter as the jacket leg or conductor pipe and welded therein. The steel cup is retained within the cylindrical housing by means of a molded elastomeric member which has a portion of the cup retrieving cable spirally wrapped within the elastomeric member. To retrieve the cup from the jacket leg or conductor pipe, a force is applied to the free end of the cable at the top of the jacket leg or conductor pipe which, in turn, progressively rips the molded elastomeric member apart thereby freeing the steel cup to move upwardly in the jacket leg or conductor pipe. However, since the plug and its housing must be installed in the jacket leg or conductor pipe during the early construction phase of the platform, any changes which would affect the platform's weight distribution are undesirable to make because they would require relocation of the plug and its housing in the jacket leg or conductor pipe. Also, once the steel cup is removed from the jacket leg or conductor pipe, since the cable embedded in the elastomeric material merely rips the elastomeric material apart, a residue of elastomeric material remains in the jacket leg or conductor pipe which must be removed therefrom.

Another type of plug used to seal the jacket legs or conductor pipes of an offshore platform is an inflatable type plug having a plurality of shoes engaging the jacket leg or conductor pipe wall anchoring the plug in position. An inflatable plug of this type has the disadvantages of the inflatable member rupturing during the towing operation which would cause an attendant loss of buoyancy, added equipment must be installed on the platform during towing operations to assure the inflation pressure of the inflatable member is maintained and the risk of deforming or damaging the jacket leg or conductor pipe walls by the shoes engaging the wall by the over inflation of the plug.

Yet another type of plug used to seal the jacket leg of an offshore platform is disclosed in U.S. Pat. No. 4,160,612. This type of plug is an inflatable type plug having locking dogs which engage an annular groove in a locking ring installed on the inside of the jacket leg. An inflatable plug of this type has the disadvantages of the inflatable member rupturing during the towing operation which would cause a loss of buoyancy, added equipment must be present to insure the inflation pressure of the inflatable rubber packer is maintained, and a locking ring must be installed inside the jacket leg to provide an annular groove which the locking dogs may engage. The installation of a cylindrical locking ring in a jacket leg having a large diameter is particularly difficult if the locking ring is not concentric with the jacket leg.

Still another type of plug used to seal the jacket legs or conductor pipes of an offshore platform is disclosed in U.S. Patent Application, Ser. No. 828,065, now U.S. Pat. No. 4,215,951. This type of plug is a compression set type having a plurality of locking dogs engaging a locking ring installed in the interior of a jacket leg or conductor pipe, having a compression set packer means sealingly engaging the interior of a jacket leg or conductor pipe and having a pressure equalization means to allow the fluid pressure across the plug to equalize before the removal of the plug from the jacket or conductor pipe. While this type of plug offers many advantages over an inflatable type plug, such as not having any sealing element inflation leakage problems or pressure maintenance problems, since the locking dogs are maintained in engagement with the locking ring by a sleeve and locking pin arrangement, in small sizes the plug can be difficult to manufacture.

Still yet another type of conductor pipe plug is illustrated in U.S. Patent Application Ser. No. 906,900, now U.S. Pat. No. 4,184,515. This type of plug comprises central body member having elastomeric sealing means and pressure equalization means thereon installed in a cylindrical housing secured to a conductor pipe. The central body member of the plug is retained within the cylindrical housing by means of a plurality of shear pins. While this type of plug is simple to construct and use, for platforms installed in large depths of water the strength of the shear pins required to retain the central body member in the cylindrical housing becomes large requiring very large diameters of cables to be required connecting with the plug for removal from the conductor pipe.

Another type of conductor pipe plug is disclosed in U.S. Patent Application Ser. No. 942,255, now U.S. Pat. No. 4,178,967. This type of plug comprises a central body member having elastomeric sealing means, pressure equalization means, and retractable release means thereon installed in a cylindrical housing secured to conductor pipe. The central body member of the plug is retained within the cylindrical housing by the retractable release means engaging an annular groove in the cylindrical housing. While this plug is simple to manufacture and use, since the retractable release means comprises a plurality of rod like members, each having the outer end thereof engaging the annular groove in the cylindrical housing, for platforms installed in very large depths of water the forces acting on the plug may be so great as to cause the ends of the retractable release means engaging the annular groove in the cylindrical housing to deform the annular groove locally, thereby making it difficult to release the plug during removal operations.

Another type plug is described in U.S. Pat. No. 2,776,015 and is used in plugging the tubing string in an oil or gas well. This plug comprises a plug body retained in tubing plug sub connected in a tubing string.

The plug is retained in the sub by means of a plurality of spheres which engage an annular recess in the sub. Under high pressures, the spheres will be deformed into the annular recess in the sub making it difficult or impossible to release the plug from the sub. Also, the plug lacks a means of indicating when it is allowing fluid flow therethrough or is being released from the sub making it difficult to use.

In contrast to the prior art plugs, the present invention provides a simple, highly reliable, easily retrievable plug for sealing the jacket legs or conductor pipes of an offshore platform or other cylindrical members. The plug of the present invention comprises an easily releasable plug body having either a compression set type packer member, cup type sealing member or inflatable packer member, having locking dogs thereon, having sleeve type releasing means abutting the locking dogs, having pressure equalization plug means abutting the sleeve type releasing means and a plug body housing.

The advantages of the present invention and the preferred embodiments of the present invention will be better understood from the following specification taken in conjunction with the accompanying drawings wherein.

Figure 1:
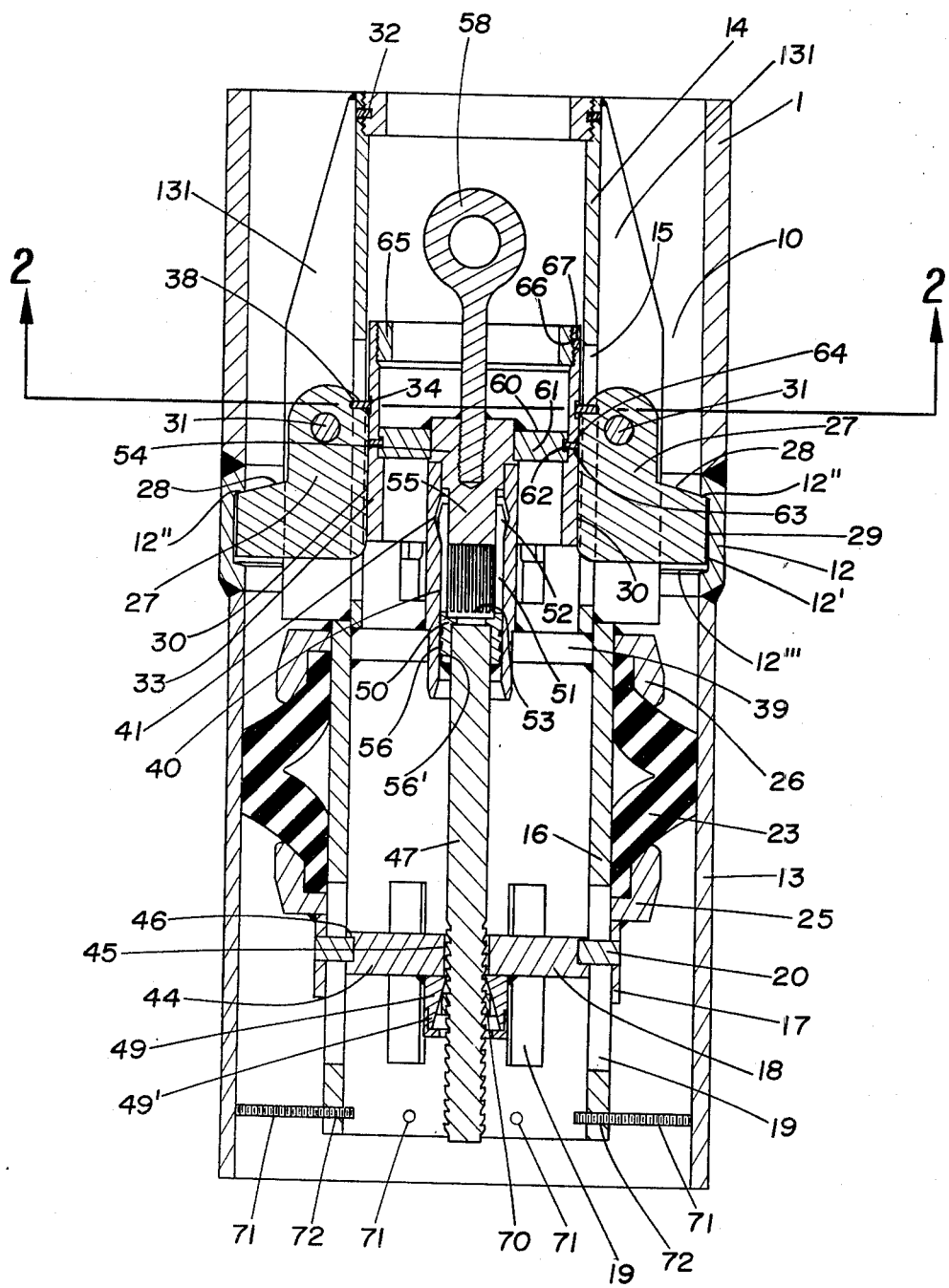
FIG. 1 is a cross-sectional view of the first preferred embodiment of the invention installed on a cylindrical member with the compression type packer member in sealing engagement with the plug housing.

Referring to FIG. 1, the first preferred embodiment of the present invention is shown. The retrievable plug comprises a plug body 10 and plug body housing 11 secured to a cylindrical member 1.

The plug body housing 11 comprises an annular member 12 having annular recess 12' therein and cylindrical member 13 secured to the annular member 12, such as by welding. The annular member 12 is secured to the end of a cylindrical member 1 by any suitable means, such as by welding. Alternatively, the plug body housing 11 may be installed at any desired position in a cylindrical member 1.

The plug body 10 comprises a sealing mandrel, packer member, packer setting sleeve and locking dogs.

The sealing mandrel is formed by cylindrical members 14 and 16 which are secured together by any suitable fastening means, although welding is preferred. The cylindrical member 14 has a plurality of locking dogs 27 mounted thereon in slots 15 to mate with annular recess 12' to retain the plug body 10 within the plug body housing 11, thereby preventing axial movement of the plug body 10 in either direction. Each locking dog 27 is pivotally attached to the cylindrical member 14 by means of a mounting pin 31 which, in turn, is attached to cylindrical member 14 by means of supports 131 or the like. Each locking dog 27 may be formed with an angular, arcuate peripheral face 28 which mates with a corresponding angular, arcuate, annular peripheral face 12" of annular recess 12', an outer arcuate peripheral face 29 and an inner arcuate peripheral face 30 which abuts dog locking sleeve 33. Alternately, the faces of the locking dogs 27 may be square cut, if so desired.

The cylindrical member 16 is formed having a plurality of slots 19 containing a plurality of pins 20 which secure outer cylindrical member 17 and inner cylindrical member 18 of the packer setting sleeve together.

Located above outer cylindrical member 17 of the packer setting sleeve is packer member 23 which may be formed of any suitable elastomeric material. The packer member 23 is held in position against upward axial movement of the sealing mandrel by means of annular ring 26. The annular ring 26 is fastened to the cylindrical member 16 of the sealing mandrel by any suitable fastening means such as welding. The packer member 23 is compressed upwardly by means of annular ring 25 which is secured to cylindrical member 17 by any suitable means, such as welding.

To seal the interior of the sealing mandrel to prevent the flow of fluid therethrough a circular plug 39 is secured to cylindrical members 14 and 16. In the center of the plug 39 is a packer member releasing collet sleeve 40 having an annular collet recess 41 therein. The packer member releasing collet sleeve 40 may be fastened to the plug 39 by any suitable means, such as welding.

A circular plug 44 is installed in the lower portion of the sealing mandrel with its outer periphery being slightly smaller in diameter than the internal diameter of cylindrical member 16. The plug 44 is formed having a bore 45 centrally located therein and a plurality of apertures 46 or annular recess in the periphery thereof receiving pins 20 therein. Secured to the lower surface of plug 44 is packer setting sleeve mandrel means 49 or bushing 49 having conically shaped interior surface 49' therein.

To hold the locking dogs 27 in engagement with the plug body retaining ring 12 a dog locking sleeve 33 is installed in cylindrical member 14. The dog locking sleeve 33 outer surface abuts the inner arcuate surface 30 of the locking dogs 27. To prevent the dog locking sleeve 33 from being removed from the interior of cylindrical member 14 an annular ring 32 is installed in the upper portion of cylindrical member 14 by any suitable means, such as threaded engagement and threaded locking pins. To secure the dog locking sleeve 33 in position, thereby camming the locking dogs 27 into engagement with the plug body retaining ring 12, a plurality of threaded shear type locking pins 38 retained in threaded apertures 37 (see FIG. 2) are provided about cylindrical member 14 and extend into annular recess 34 in the exterior surface of dog locking sleeve 33. Any desired number or size of locking pins 38 may be used to secure the dog locking sleeve 33 in position.

Secured to the interior of dog locking sleeve 33 is a plug 60 which comprises annular ring 61 having an annular recess 62 in the outer periphery thereof and the central plug 54 secured thereto. To secure plug 60 to dog locking sleeve 33 a plurality of threaded shear type locking pins 63 retained in threaded apertures 64 in dog locking sleeve 33 extend from the dog locking sleeve 33 into annular recess 62 of the plug 60. To prevent the removal of plug 60 from the dog locking sleeve 33, a threaded ring 65 is installed in the interior of the upper end of the sleeve 33. If desired, the threaded ring 65 may have threaded locking pins 66 which extend from threaded apertures 67 in dog locking sleeve 33 engaged therewith to prevent the accidental removal of threaded ring 65 from sleeve 33.

Packer member releasing collet 50 is held in position in collet releasing sleeve 40 by means of the enlarged ends 52 of collet fingers 51 which are separated by spaces 53 mating with recess 41 in collet releasing sleeve 40. The lower portion 55 of the central plug 54 biases the ends 52 of collet fingers 51 into the recess 41, thereby preventing the removal of collet 50 from collet releasing sleeve 40 until the central plug 54 of plug 60 is removed. The lower end of releasing collet 50 contains a plurality of annular seal means 56 retained in annular cavities 56' which sealingly engage the interior of collet releasing sleeve 40 to prevent fluid flow between the packer member releasing collet 50 and collet releasing sleeve 40. Any suitable annular seal means 56 may be used to sealingly engage collet releasing sleeve 40, such as an elastomeric O-ring type annular seal means.

The lower end of packer member releasing collet 50 is secured to the packer setting mandrel 47 by any suitable means, such as welding. The packer setting mandrel 47 is aligned with and passes through bore 45 of plug 44 terminating exteriorly of plug 44. The lower end 48 of packer setting mandrel 47 is threaded to receive packer locking nut 70 thereon.

As further shown in FIG. 1, a plug eye 58 is installed in plug 60 to allow the plug body 10 to be removed from plug body housing 11. Also, if desired, threaded members 71 may be installed in threaded apertures 72 in the lower periphery of cylindrical member 16 to centralize the plug body 10 within the plug body housing 11 and to support the weight of the plug 10 when the plug is in a horizontal position.

Figure 2:
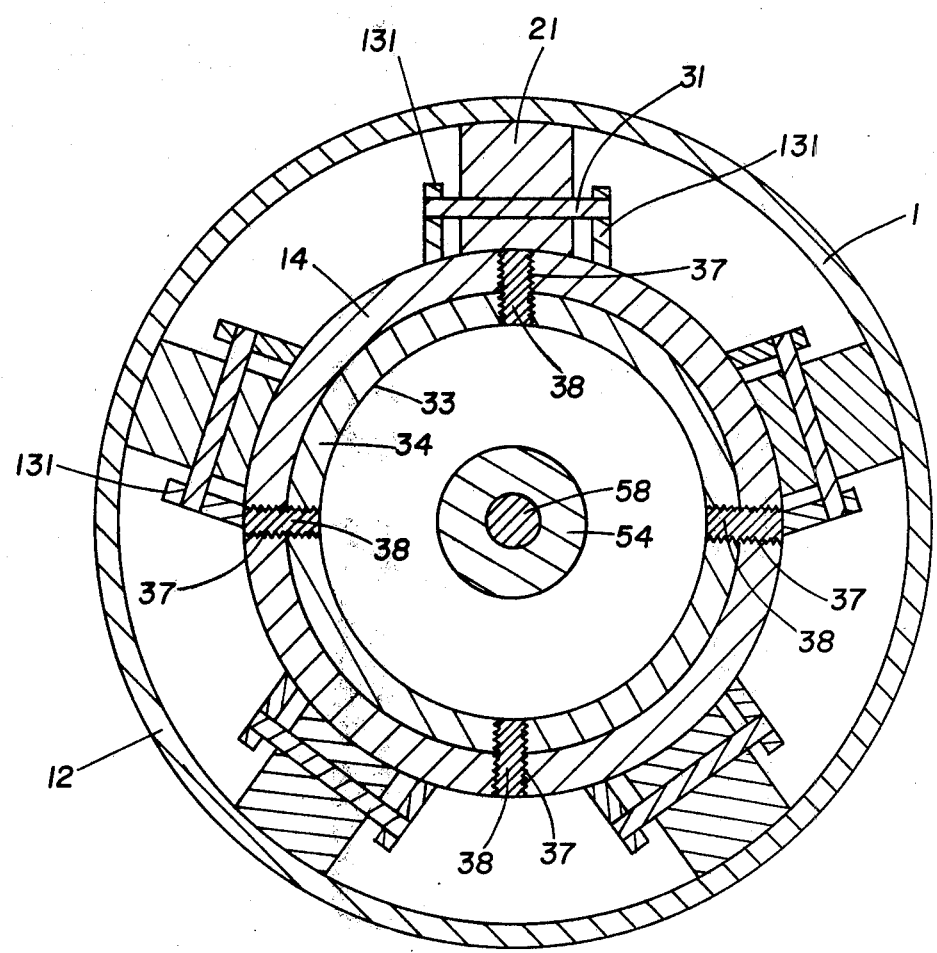
FIG. 2 is a cross-sectional view taken along lines 2—2 of FIG. 1 of the first embodiment of the invention.

Referring to FIG. 2, the relationship of the shear type locking pins 38 retaining the dog locking sleeve 33 in position in cylindrical member 14 can be seen. As can be seen in FIG. 2, the shear type locking pins merely extend from cylindrical member 14 into dog locking sleeve 33 and do not engage locking dogs 27 themselves. Any desired number of shear type locking pins 38 may be used to retain dog locking sleeve 33 in position engaging locking dogs 27, thereby camming locking dogs 27 into engagement with annular member 12 depending upon the desired shear force.

Referring again to FIG. 1, to install the retrievable plug on a cylindrical member, the plug body housing 11 is welded to the end of the cylindrical member or at any desired location therein. Subsequently, the plug body 10 is moved in position with surface 28 of the locking dogs 27 abutting annular member 12 of the plug body housing 11.

To compress the packer member 23 into engagement with cylindrical member 13 of the plug body housing 11, a hydraulic jack or other device is attached to the threaded end portion 48 of the packer setting mandrel 47 to apply sufficient force to the packer setting sleeve 17 to compress the packer member to seal the annulus between the plug body 10 and plug body housing 11. During the packer member setting process, the packer member 23 is compressed between the annular ring 26 and annular ring 25 secured to the packer setting sleeve 17. Once the packer member 23 is set to seal the annulus between the plug body 10 and plug body housing 11, the packer locking nut 70 is advanced to abut the conical surface 49' of bushing 49 secured to the lower surface of plug 44 at which time the jack or other setting device may be removed from the threaded end portion 48 of the packer setting mandrel 47. The packer setting mandrel 47 is prevented from axial movement by being secured at its upper end by means of the enlarged ends 52 of the collet fingers 51 being trapped in the annular recess 42 of the collet sleeve 40 by the lower end 55 of the central plug 54 of plug 60.

It should be noted that any forces applied from below the plug body 10 will tend to set the packer member 23 tighter in the annulus between the plug body 10 and plug body housing 11. The axial loading on the plug body 10 is carried by locking dogs 27 abutting surfaces 12″ and 12‴ of annular recess 12 of plug body housing 11. Additionally, when the packer member 23 is set, any fluid entering collet sleeve 40 is prevented from flowing therethrough by annular sealing means 55 in packer member releasing collet 50 sealingly engaging the interior of collet sleeve 40.

Figure 3:
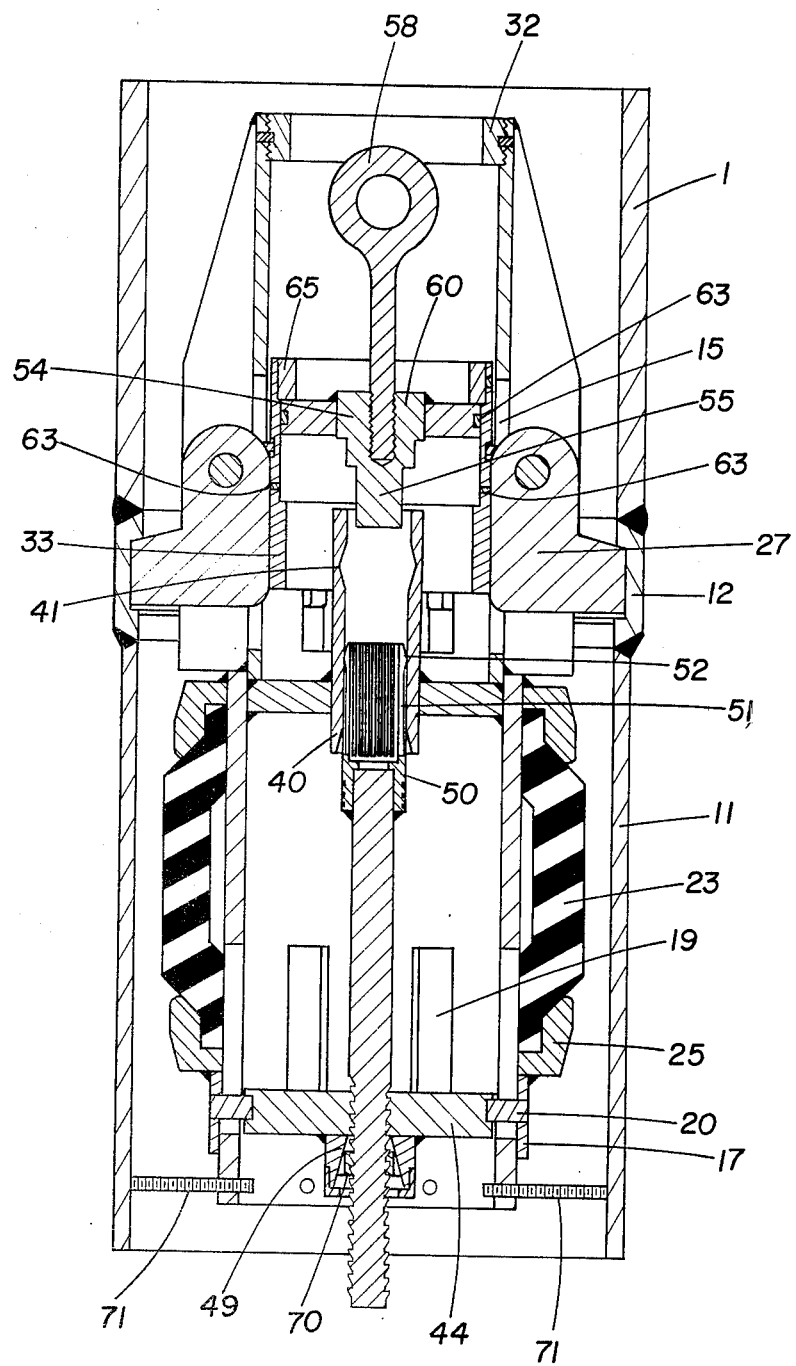
FIG. 3 is a cross-sectional view of the first embodiment of the invention installed on a cylindrical member with the compression type packer member disengaged.

Referring to FIG. 3, the plug body 10 is shown with plug 60 removed from collet sleeve 40, thereby allowing fluid to flow around and through the plug body 10 while the locking dogs 27 are still engaging annular recess 12 of the plug body housing 11, thereby allowing the fluid pressure to equalize across the plug body 11. By releasing the packer member 23 from engagement with plug body housing 11 while keeping locking dogs 27 in engagement with annular recess 12 of the plug body housing, any pressure differential forces acting across the plug body 11 can be allowed to equalize by letting fluid flow around and through the plug body 11, thereby allowing the safe removal of the plug body 11 upwardly from the housing 11 through the cylindrical member 1.

When the plug body 10 is installed in the plug body housing 11 which is connected to a cylindrical member 1, a cable (not shown) or other suitable means is secured to eye 58 and run through cylindrical member 1 to the end thereof to allow the removal of the plug body 10 from the cylindrical member 1. When a force having a first level of magnitude is applied to the cable secured to eye 58, shear type locking pins 63 which retain plug 60 within locking dog sleeve 33 are sheared, thereby allowing plug 60 to move upwardly in locking dog sleeve 33 until it abuts threaded ring 65. When plug 60 moves upwardly in dog locking sleeve 33, the lower portion 55 of central plug 54 of plug 60 disengages the enlarged ends 52 of collet fingers 51 which mate with recess 41 in collet releasing sleeve 40, thereby allowing packer member releasing collet 50 to move downwardly in collet releasing sleeve 40 due to the resilient biasing forces of the compression type packer member 23 being transmitted through annular ring 25 secured to packer setting sleeve 17 which is, in turn, secured to circular plug 44 which threadedly engages the packer setting mandrel 47 secured to collet releasing sleeve 40. Since the packer member releasing collet 50 no longer has the enlarged ends 52 thereof retained in annular groove 41 in collet releasing sleeve 40, the packer member 23 disengages the plug body housing to allow the flow of fluid between the plug body 10 and the plug body housing 11 and the flow of fluid through slots 19, through collet releasing sleeve 40 and through slots 15 and other apertures above plug 39 in the plug body 10, thereby allowing the equalization of any pressure differential across the plug body 10 while the locking dogs 27 engage the annular recess 12 of the plug body housing 11, thereby maintaining the plug body 10 in the plug body housing 11.

Figure 4:
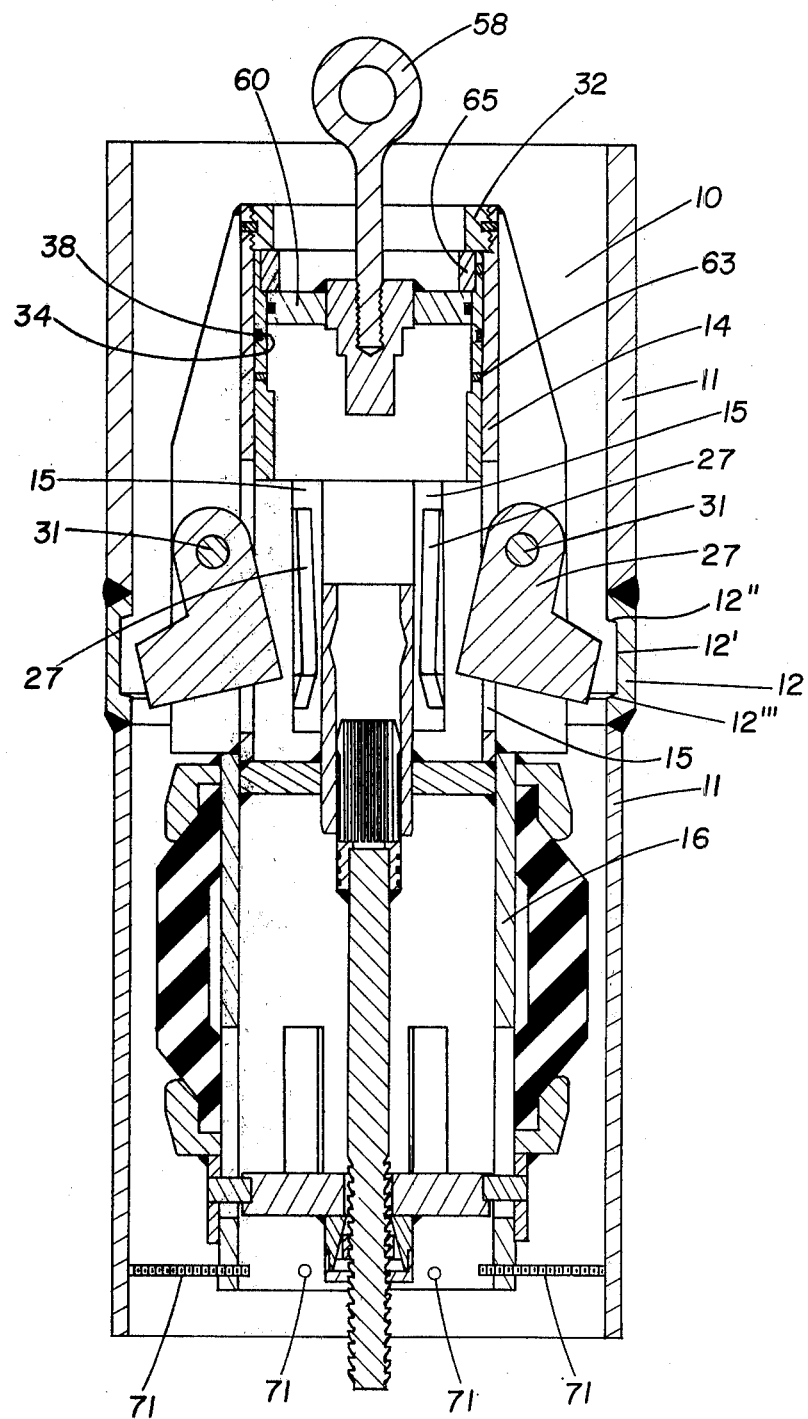
FIG. 4 is a cross-sectional view of the first embodiment of the invention installed on a cylindrical member with the locking dogs released from engagement with the plug body retaining means allowing the plug to be removed.

Referring to FIG. 4, the plug body 10 is shown being removed from the plug body housing 11 and cylindrical member 1. To remove the plug body 10 from the plug body housing 11 once the packer member 23 no longer sealingly engages plug body housing 11, it is necessary to disengage the locking dogs 27 from annular groove 12 in plug body housing 11. To allow disengagement of the locking dogs 27 from the annular groove 11, the dog locking sleeve 33 must disengage the locking dogs 27 to allow their inward movement through slots 15 in cylindrical member 14 of the sealing mandrel. To disengage dog locking sleeve 33 from locking dogs 27, a force having a greater magnitude than the force utilized to shear locking pins 63 is applied through eye 58 to plug 60 which abuttingly engages threaded ring 65 of dog locking sleeve 33, thereby causing shear type locking pins 38 which extend from cylindrical member 14 into annular groove 62 in the dog locking sleeve 33 to be sheared, thereby allowing dog locking sleeve 33 to move upwardly in cylindrical member 14 until it abuts annular ring 32 retained in the upper end portion of cylindrical member 14. When the dog locking sleeve 33 is abutting annular ring 32 in cylindrical member 14 and a force is continuously applied through eye 58 to dog locking sleeve 33, the dog locking sleeve 33 no longer engages locking dogs 27, thereby allowing the locking dogs 27 to rotate inwardly about pins 31 through slots 15 in the cylindrical member 14 by being cammed inwardly out of engagement with annular face 12' of annular recess 12.

Through the continued application of a force to eye 58 when the dog locking sleeve 33 abuts annular ring 32 secured to cylindrical member 14 and when the locking dogs 27 are disengaged from annular recess 12, the plug body 10 is moved through the cylindrical member 11 and may be removed therefrom. During the removal of the plug body 10 from the cylindrical member 1, the threaded pins 71 may be deformed by impacting with the plug body housing 11 or cylindrical member 1, thereby allowing the unrestricted removal of the plug body 10.

After being removed from the plug body housing 11 and cylindrical member 1, the plug body 10 may be reused merely by replacing the expendable shear pins 38 and 63 and threaded pins 71.

To replace shear pins 63, the dog locking sleeve is removed from cylindrical member 14 by removing annular ring 32 therefrom. When the dog locking sleeve 33 is removed from cylindrical member 14, those portions of shear pins 38 remaining in annular groove 34 in the exterior surface of dog locking sleeve 33 may be removed and the annular groove 34 inspected for any damage thereto. After the dog locking sleeve 33 is removed from cylindrical member 14, the threaded retaining ring 65 retaining plug 60 within the dog locking sleeve 33 is removed from the dog locking sleeve 33, thereby allowing the plug 60 to be removed from the interior of the dog locking sleeve 33. After the plug 60 has been removed from the dog locking sleeve 33, those portions of shear pins 63 remaining in annular recess 62 may be removed therefrom and the annular recess 62 inspected for damage thereto.

After those portions of shear pins 63 remaining in annular recess 62 are removed therefrom, those portions of shear pins 63 remaining in threaded apertures 64 are removed therefrom, and the annular recess 62 has been inspected, the plug 60 is installed in the dog locking sleeve 33 by the insertion of the plug 60 thereinto and the installation of unsheared shear pins 63 into dog locking sleeve 33. At this point, threaded ring 65 is reinstalled in the dog locking sleeve 33.

To replace shear type locking pins 38 which retain the dog locking sleeve 33 in position in cylindrical member 14 of the plug body 10, the plug body 10 is inserted into another cylindrical housing 11 with the locking dogs 27 of the plug body in alignment with annular recess 12 of the cylindrical housing 11. When the plug body 10 is in this position in the cylindrical housing 11, the dog locking sleeve 33 is moved into engagement with face 30 of each locking dog 27, thereby camming the locking dogs 27 into annular recess 12. When annular groove 34 of the locking dog sleeve 33 aligns with threaded apertures 37 in cylindrical member 14, new shear type pin means 38 may be installed in the cylindrical member 14, each pin means 38 having one end thereof engaging annular groove 34, thereby retaining dog locking sleeve 33 in abutting engagement with face 30 of each locking dog 27 which, in turn, engages annular recess 12 of the cylindrical housing 11.

At this time, after the replacement of any damaged threaded members 71, the threaded members 71 may be engaged with the interior cylindrical housing 11 to center the lower end plug body 10 in the cylindrical housing 11.

With the plug body 10 installed in the cylindrical housing 11, the cylindrical housing 11 may be installed on a cylindrical member 1 having the packer member 23 of the plug body 10 being compressed into engagement with the interior of the cylindrical housing 11 at any time prior or subsequent to the installation of the cylindrical housing 11 on the cylindrical member 1.

Figure 5:
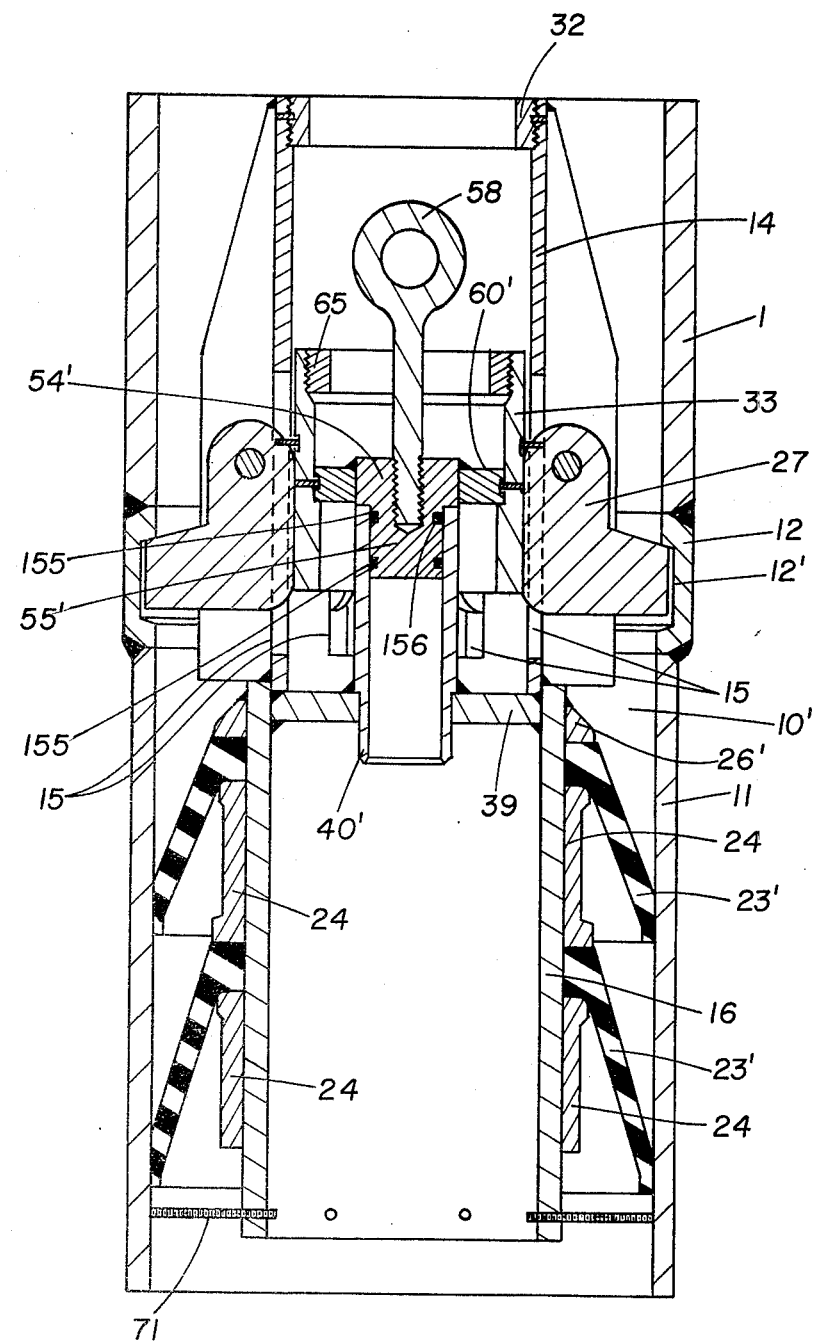
FIG. 5 is a cross-sectional view of a second preferred embodiment of the present invention having cup type seal members.

Referring to FIG. 5, an alternative preferred embodiment is shown. The plug body 10' is shown installed in a cylindrical plug body housing 11. While the plug body housing 11 is the same as that shown in FIGS. 1 through 4, the plug body 10' comprises a sealing mandrel, sealing members and locking dogs.

The sealing mandrel is similar to the packer mandrel shown in FIGS. 1 through 4 and is formed by cylindrical members 14 and 16 secured together by any suitable fastening means, such as welding. The cylindrical member 14 has a plurality of locking dogs 27 mounted thereon in slots 15 to mate with annular recess 12' to retain plug body 10' within the plug body housing 11. The locking dogs 27 shown in FIG. 5 are similar in shape and mounting to those shown in FIG. 1 through 4.

Installed on the outer diameter of cylindrical member 16 are sealing cup members 23' which sealingly engage the interior surface of plug body housing 11 when the plug body 10' is installed therein. The sealing cup members 23 may be formed of any suitable elastomeric material and may contain suitable reinforcing material therein, if desired.

One of the sealing cup members 23' is restrained from movement in one direction on the cylindrical member 14 by abutting annular ring 26 which is secured to the cylindrical member 16 by any suitable means, such as welding. The sealing member 23' is restrained from movement in the other direction on the cylindrical member 14 by abutting annular ring 24 which is secured to the cylindrical member 16 by any suitable means, such as welding. The other sealing cup member 23' is restrained from movement on the cylindrical member 16 by abutting an annular ring 24 installed on either side thereof.

To seal the interior of the sealing mandrel to prevent the flow of fluid therethrough a circular plug 39 is secured to cylindrical members 14 and 16. In the center of the plug 39 is a sleeve 40' which may be secured to the plug 39 by any suitable means, such as welding.

To hold the locking dogs 27 in engagement with the plug body retaining ring 12 a dog locking sleeve 33 is installed in cylindrical member 14. The outer surface of the dog locking sleeve 33 abuts the inner arcuate surface 30 of the locking dogs 27. To prevent the dog locking sleeve 33 from being removed from the interior of cylindrical member 14, an annular ring 32 is installed in the upper portion of cylindrical member 14 by any suitable means, such as a threaded connection having threaded locking pins. The dog locking sleeve 33 is secured in position in cylindrical member 14 in the same manner as shown in the plug body 10 illustrated in FIGS. 1 through 4 hereinbefore.

Similarly, the plug 60' is secured to the interior of the dog locking sleeve 33 in the same manner as shown in the plug body 10 illustrated in FIGS. 1 through 4 hereinbefore.

However, in contrast to the central plug 54 described in FIGS. 1 through 4 hereinbefore, the central plug 54' of plug 60' comprises a lower portion 55' which contains annular seal means 156 in annular cavities 157 therein. The annular seal means 156 may be any suitable type seal means, such as an elastomeric O-ring type seal means. When the annular seal means 156 of the central plug 54' engage the interior of sleeve 40', the flow of fluid through the sleeve 40' is prevented.

To remove the plug body 10' from the plug body housing 11 which is connected to a cylindrical member 1, a cable (not shown) or other suitable means is secured to eye 58 and run through cylindrical member 1 to the end thereof. When a force having a first level of magnitude is applied to the cable secured to eye 58, shear type locking pins 63 which retain plug 60' within locking dog sleeve 33 are sheared, thereby allowing plug 60' to move upwardly in locking dog sleeve 33 until it abuts threaded ring 65. When plug 60' moves upwardly in dog locking sleeve 33, the lower portion 55' of central plug 54' of plug 60' disengages the interior of sleeve 40' thereby allowing the equalization of any pressure differential across the plug body 10' by allowing fluid to flow through sleeve 40' while the locking dogs 27 remain in engagement with the annular recess 12' of the plug body housing 11, thereby maintaining the plug body 10' in the plug body housing 11.

Once the fluid pressure has equalized across the plug body 10', the plug body 10' may be removed from the plug body housing 11 in the same manner as plug body 10 described hereinbefore in FIGS. 1 through 4.

Figure 6:
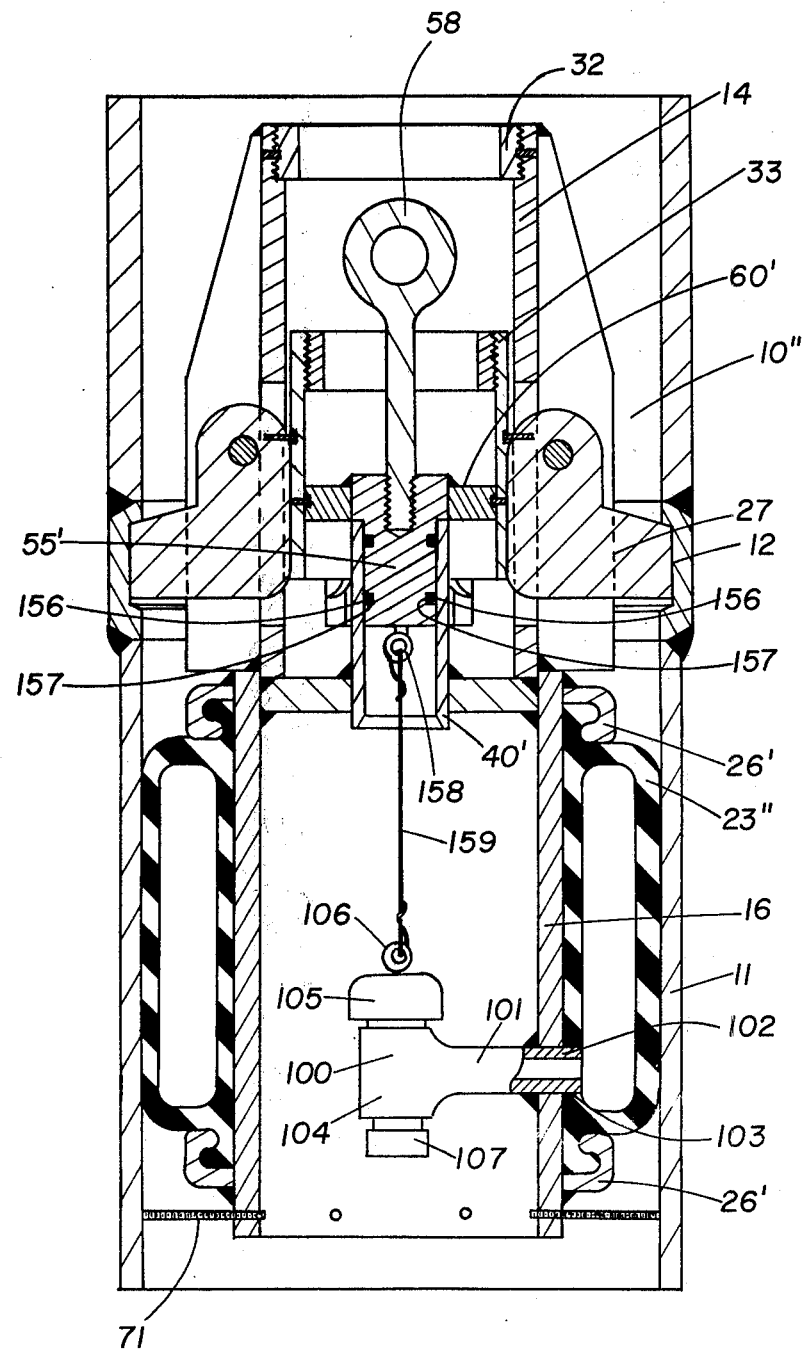
FIG. 6 is a cross-sectional view of a third preferred embodiment of the present invention having inflatable type sealing means.

Referring to FIG. 6, another alternative preferred embodiment of the present invention is shown. The plug body 10" is shown installed in a cylindrical housing 11. While the plug body housing 11 is the same as that shown in FIGS. 1 through 4, the plug body 10" comprises a sealing mandrel, inflatable sealing member and locking dogs.

The sealing mandrel is similar to the packer mandrel shown in FIGS. 1 through 4 and is formed by cylindrical members 14 and 16 secured together by any suitable fastening means, such as welding. The cylindrical member 14 has a plurality of locking dogs 27 mounted thereon in slots 15 to mate with annular recess 12' to retain plug body 10" within the plug body housing 11. The locking dogs 27 shown in FIG. 6 are similar in shape and mounting to those shown in FIGS. 1 through 4.

Installed on the outer diameter of cylindrical member 16 is annular inflatable sealing member 23" which sealingly engages the interior surface of plug body housing 11 when the plug is installed therein and the annular inflatable sealing member 23" is inflated. The annular inflatable sealing member 23" comprises an annular elastomeric member having the ends thereof securely anchored by means of the lugs thereon engaging annular members 26' which are, in turn, secured to cylindrical member 16. The annular inflatable sealing member 23" may be formed of any suitable elastomeric material and may be reinforced, if so desired. The inflation assembly 100 generally comprises a conduit 101 having an end 102 which communicates with the interior of annular inflatable sealing member 23" via opening 102 therein and a second end 103 which communicates with connector 104. On one end of connector 104 is a quick disconnect plug 105 having attachment means 106 thereon. On the other end of connector 104 is cap 107 which is threadedly secured thereto for easy removal and installation. Contained within the body of connector 104 is suitable check valve means to allow the passage of an inflation media into the connector body 104 through conduit 101 into inflatable sealing means 23" sealingly secured thereto, but which prevents the passage of the inflation media from connector 104 when cap 107 is not installed thereon.

To seal the interior of the sealing mandrel to prevent the flow of fluid therethrough, a circular plug 39 is secured to cylindrical member 14 and 16. In the center of the plug 39 is a sleeve 40' which may be secured to the plug 39 by any suitable means, such as welding.

To hold the locking dogs 27 in engagement with the retaining ring 12, a dog locking sleeve 33 is installed in cylindrical member 14. The outer surface of the dog locking sleeve 33 abuts the inner arcuate surface 30 of the locking dogs 27. To prevent the dog locking sleeve 33 from being removed from the interior of cylindrical member 14, an annular ring 32 is installed in the upper portion of cylindrical member 14 by any suitable means, such as a threaded connection having threaded locking pins. The dog locking sleeve 33 is secured in position in cylindrical member 14 in the same manner as shown in the plug body 10 illustrated in FIGS. 1 through 4 hereinbefore.

Similarly, the plug 60' is secured to the interior of the dog locking sleeve 33 in the same manner as shown in the plug body 10 illustrated in FIGS. 1 through 4 hereinbefore. Additionally, the central plug 54' of the plug 60' comprises a lower portion 55' which contains annular seal means 156 in annular cavities 157. The annular seal means 156 may be any suitable type seal means, such as an elastomeric O-ring type seal means. When the annular seal means 156 of the central plug 54' engage the interior of sleeve 40', the flow of fluid through the sleeve 40' is prevented. Secured to the bottom of plug 54' is attached means 158 having one end of cable means 159 secured thereto, while the other end of cable means 159 is secured to attachment means 106 on quick disconnect plug 105 of connector body 104.

To install the retrievable plug 10" on a cylindrical member, the plug body housing 11 is welded to the end of the cylindrical member or at any desired location therein. Subsequently, the plug body 10" is moved in position with surface 28 of the locking dogs 27 abutting annular member 12 of the plug body housing 11.

After the plug 10" has been installed, to inflate inflatable annular member 23", cap 107 is removed from connector body 104 and an inflation line (not shown) is connected thereto. An inflation fluid media is supplied through the inflation line to the connector body 104 which flows through conduit 101 to the interior of inflatable annular member 23". When the inflatable annular member 23" has been inflated to the desired pressure level and the member sealingly engages the interior of plug body housing 11, the inflation line is removed, the check valve means within connector body 104 trap the inflation fluid in the inflatable annular member 23" and the cap 107 is reinstalled on connector body 104.

To remove the plug body 10" from the plug body housing 11, a cable (not shown) or other suitable means is secured to eye 58 and run through cylindrical member 1 to the end thereof. When a force having a first level of magnitude is applied to the cable secured to eye 58, shear type locking pins 63 which retain plug 60' within locking dog sleeve 33 are sheared, thereby allowing plug 60' to move upwardly in locking dog sleeve 33 until it abuts threaded ring 65. When plug 60' moves upwardly in dog locking sleeve 33, the lower portion 55' of central plug 54' of plug 60' disengages the interior of sleeve 40' and simultaneously line 159 secured to attachment means 158 of plug 60' removes quick disconnect plug 105 from the connector body 104, thereby allowing the equalization of any pressure differential across the plug body 10" by allowing fluid to flow through sleeve 40' and allowing the annular inflatable member to deflate and disengage the interior of plug body housing 11 allowing, in turn, fluid to flow around plug body 10" while the locking dogs 27 remain in engagement with the annular recess 12' of the plug body housing 11, thereby maintaining the plug body 10" in the plug body housing 11.

Once the fluid pressure has equalized across plug body 10", the plug body 10" may be removed from the plug body housing 11 in the same manner as plug body 10 described hereinbefore in FIGS. 1 through 4.

It should be readily apparent from the foregoing that the various elements of the plug body and plug body housing may be formed as weldments or machinings.

Although the plugs 10, 10' and 10" have been described in relationship to a conductor pipe of an offshore platform, the plugs could be used to seal any circular member of any desired diameter where a temporary seal is desired, such as pipes, conduits, etc.

While the invention has been described with reference to preferred and alternative embodiments, it will be appreciated by those skilled in the art that additions, deletions, modifications, or other changes not specifically described may be made which fall within the purview of the appended claims.

Having thus described my invention, I claim:

1. A removable plug for temporarily sealing the interior of an annular member to prevent the flow of fluid therethrough, said removable plug comprising:
plug body means disposed within said annular member, said plug body means comprising:
sealing mandrel means;
sealing member means located on the sealing mandrel means for sealingly engaging the interior of said annular member;
locking dog means pivotally mounted on said plug body means for retaining said plug from axial movement in at least one direction in said annular member;
dog locking sleeve means abutting the locking dog means in releasable engagement therewith; and
pressure equalization plug means abutting the dog locking sleeve means in releasable engagement therewith for allowing the flow of said fluid through said plug, thereby allowing the pressure of said fluid to substantially equalize in said annular member and across said plug before the removal of said plug from said annular member.

2. The plug of claim 1 further comprising:
first shear type releasing means releasably securing the pressure equalization plug means to the dog locking sleeve means, thereby preventing the flow of said fluid through said plug.

3. The plug of claim 2 further comprising:
second shear type releasing means releasably securing the dog locking sleeve means to the sealing mandrel means, thereby retaining the dog locking sleeve means abutting the locking dog means.

4. The plug of claim 3 wherein the first shear type releasing means are sheared by a force having a first level of magnitude thereby releasing the pressure equalization plug means from the dog locking sleeve means and the second shear type releasing means are sheared by a force having a second level of magnitude greater than the force having a first level of magnitude thereby releasing the dog locking sleeve from the sealing mandrel means.

5. The plug of claim 4 wherein the sealing mandrel means comprises:
annular member means having circular plug means therein, having sleeve means having an annular recess located therein, the sleeve means secured within the circular plug means, having sealing member retaining means on the exterior thereof, and having dog locking support means on the exterior thereof.

6. The plug of claim 5 wherein the pressure equalization plug means sealingly engages the sleeve means located within the circular plug means of the sealing mandrel means when the pressure equalization plug means are retained in abutting engagement with the dog locking sleeve means by the first shear type releasing means.

7. The plug of claim 6 wherein the sealing member means comprises annular elastomeric compression type packer means.

8. The plug of claim 7 wherein the sealing mandrel means further comprises:
packer setting sleeve means located on the sealing mandrel means for compressing the annular elastomeric compression type packer means.

9. The plug of claim 8 wherein the packer setting sleeve means comprises:
packer setting sleeve mandrel means;
circular plug means having the packer setting sleeve mandrel means centrally located therein;
outer cylindrical member means secured to the circular plug means by pin means extending through slots in the sealing mandrel means and located adjacent the outer diameter of the sealing mandrel means.

10. The plug of claim 9 further comprising:

collet member means having a plurality of spring fingers, each finger having an enlarged end thereon retained in the annular recess in the sleeve in the sealing mandrel means;

packer setting mandrel means having one end secured to the collet member means while the other end extends through the packer setting sleeve means; and fastening means located on the other end of the packer setting mandrel means abutting the packer setting sleeve means.

11. The plug of claim 6 wherein the sealing member means comprises annular elastomeric cup type sealing means.

12. The plug of claim 6 wherein the sealing member means comprises annular elastomeric inflatable packer means.

13. The plug of claim 12 further comprising:

inflation assembly means having conduit means thereon sealingly engaging the interior of the annular elastomeric inflatable packer means, having connector means having check valve means therein, having on one end of the connector means quick disconnect plug means having attachment means thereon, and having cap means on the other end of the connector means.

14. The plug of claim 13 further comprising:

attachment means secured to the pressure equalization plug means; and cable means having one end secured to the attachment means on the pressure equalization plug means while the other end is secured to the attachment on the quick disconnect plug means, the cable means having a length such that disengagement of the pressure equalization plug means from the sleeve means in the sealing mandrel means causes disengagement of the quick disconnect plug means by removal thereof from the inflation assembly means.

15. A removable plug for temporarily sealing the interior of a conductive pipe of an offshore platform or other similar annular member to prevent the flow of fluid therethrough, said removable plug comprising:

annular plug body housing means having an annular recess therein, said annular plug body housing means being secured to said conductor pipe or other similar annular member; and plug body means disposed within said annular plug body housing means, said plug body means comprising:

sealing mandrel means;

sealing member means located on said sealing mandrel means for sealingly engaging the interior of said annular plug body housing means;

locking dog means pivotally mounted on said plug body means releasably engaging the annular recess in said annular plug body housing means, thereby retaining said plug body from axial movement in at least one direction in said annular member;

dog locking sleeve means abutting the locking dog means in releasable engagement therewith; and pressure equalization plug means abutting the dog locking sleeve means in releasable engagement therewith for allowing the flow of said fluid through said plug, thereby allowing the pressure of said fluid to substantially equalize in said conductor pipe or other similar annular member and across said plug before the removal of said plug from said conductor pipe or other similar annular member.

16. The plug of claim 15 further comprising:

first shear type releasing means releasably securing the pressure equalization plug means to the dog locking sleeve means, thereby preventing the flow of said fluid through said plug.

17. The plug of claim 16 further comprising:

second shear type releasing means releasably securing the dog locking sleeve means to the sealing mandrel means, thereby retaining the dog locking sleeve means abutting the locking dog means.

18. The plug of claim 17 wherein the first shear type releasing means are sheared by a force having a first level of magnitude thereby releasing the pressure equalization plug means from the dog locking sleeve means and the second shear type releasing means are sheared by a force having a second level of magnitude greater than the force having a first level of magnitude thereby releasing the dog locking sleeve from the sealing mandrel means.

19. The plug of claim 18 wherein the sealing mandrel means comprises:

annular member means having circular plug means therein, having sleeve means having an annular recess located therein, the sleeve means secured within the circular plug means, having sealing member retaining means on the exterior thereof, and having dog locking support means on the exterior thereof.

20. The plug of claim 19 wherein the pressure equalization plug means sealingly engages the sleeve means located within the circular plug means of the sealing mandrel means when the pressure equalization plug means are retained in abutting engagement with the dog locking sleeve means by the first shear type releasing means.

21. The plug of claim 20 wherein the sealing member means comprises annular elastomeric compression type packer means.

22. The plug of claim 21 wherein the sealing mandrel means further comprises:

packer setting sleeve means located on the sealing mandrel means for compressing the annular elastomeric compression type packer means.

23. The plug of claim 22 wherein the packer setting sleeve means comprises:

packer setting sleeve mandrel means;

circular plug means having the packer setting sleeve mandrel means centrally located therein;

outer cylindrical member means secured to the circular plug means by pin means extending through slots in the sealing mandrel means and located adjacent the outer diameter of the sealing mandrel means.

24. The plug of claim 23 further comprising:

collet member means having a plurality of spring fingers, each finger having an enlarged end thereon retained in the annular recess in the sleeve in the sealing mandrel means;

packer setting mandrel means having one end secured to the collet member means while the other end extends through the packer setting sleeve means; and fastening means located on the other end of the packer setting mandrel means abutting the packet setting sleeve means.

25. The plug of claim 20 wherein the sealing member means comprises annular elastomeric cup type sealing means.

26. The plug of claim 20 wherein the sealing member means comprises annular elastomeric inflatable packer means.

27. The plug of claim 26 further comprising:
inflation assembly means having conduit means thereon sealingly engaging the interior of the annular elastomeric inflatable packer means, having connector means having check valve means therein, having on one end of the connector means quick disconnect plug means having the attachment means thereon, and having cap means on the other end of the connector means.

28. The plug of claim 27 further comprising:
attachment means secured to the pressure equalization plug means; and
cable means having one end secured to the attachment means on the pressure equalization plug means while the other end is secured to the attachment on the quick disconnect plug means, the cable means having a length such that disengagement of the pressure equalization plug means from the sleeve means in the sealing mandrel means causes disengagement of the quick disconnect plug means by removal thereof from the inflation assembly means.

29. A removable plug for temporarily sealing the interior of a conductor pipe of an offshore platform or other similar annular member to prevent the flow of fluid therethrough, said removable plug comprising:
annular plug body housing means having an annular recess therein, said annular plug body housing means being secured to said conductor pipe or other similar annular member; and
plug body means disposed within said annular plug body housing means, said plug body means comprising:
sealing mandrel means, the sealing mandrel mean comprising:
annular member means having circular plug means therein, having sleeve means having an annular recess located therein, the sleeve means secured within the circular plug means, having sealing member retaining means on the exterior thereof, and dog locking support means on the exterior thereof; annular elastomeric compression type packer means located on the sealing mandrel means for sealingly engaging the interior of said annular plug body housing means, the annular elastomeric compression type packer means having one end abutting the sealing member retaining means on the exterior of the sealing mandrel means;
packer setting sleeve means located on the sealing mandrel means for compressing the annular elastomeric compression type packer means, the packer setting sleeve means comprising:
packer setting sleeve mandrel means;
circular plug means having the packer setting sleeve mandrel means centrally located therein; and
outer cylindrical member means secured to the circular plug means by pin means extending through slots in the sealing mandrel of the sealing mandrel means;
collet member means having a plurality of spring fingers, each finger having an enlarged end thereon retained in the annular recess in the sleeve in the sealing mandrel means;
packer setting mandrel means having one end secured to the collet member means while the other end extends through the packer setting sleeve means;
fastening means located on the other end of the packer setting mandrel means abutting the packer setting sleeve means;
locking dog means pivotally mounted on the dog locking support means of the sealing mandrel means for retaining said plug from axial movement in at least one direction in said annular member;
dog locking sleeve means abutting the locking dog means in releasable engagement therewith;
pressure equalization plug means abutting the dog locking sleeve means in releasable engagement therewith, the pressure equalization plug means sealingly engaging the sleeve means located within the circular plug means of the sealing mandrel means when the pressure equalization plug means is retained in abutting engagement with the dog locking sleeve means;
first shear type releasing means releasably securing the pressure equalization plug means to the dog locking sleeve means, thereby preventing the flow of fluid through said plug, the first shear type releasing means releasing the pressure equalization plug means when a force having a first level of magnitude is applied to the pressure equalization plug means; and
second shear type releasing means releasably securing the dog locking sleeve means to the sealing mandrel means, thereby retaining the dog locking sleeve means abutting the locking dog means, the second shear type releasing means releasing the pressure equalization plug means from the sealing mandrel means when a second force having a second level of magnitude greater than the force having a first level of magnitude is applied to said plug.

30. A removable plug for temporarily sealing the interior of a conductor pipe of an offshore platform or other similar annular member to prevent the flow of fluid therethrough, said removable plug comprising:
annular plug body housing means having an annular recess therein, said annular plug body housing means being secured to said conductor pipe or other similar annular member; and
plug body means disposed within said annular plug body housing means, said plug body means comprising:
sealing mandrel means, the sealing mandrel means comprising:
annular member means having circular plug means therein, having sleeve means located in the circular plug means, having sealing member retaining means on the exterior thereof, and dog locking support means on the exterior thereof;
annular elastomeric cup type sealing means located on the sealing mandrel means for sealingly engaging the interior of said annular plug body housing means, the annular elastomeric cup type sealing means being retained on the sealing mandrel means by the sealing member retaining means thereon;
locking dog means pivotally mounted on the dog locking support means of the sealing mandrel for retaining said plug from axial movement in at least one direction in said annular member;

dog locking sleeve means abutting the locking dog means in releasable engagement therewith;

pressure equalization plug means abutting the dog locking sleeve means in releasable engagement therewith, the pressure equalization plug means sealingly engaging the sleeve means located within the circular plug means of the sealing mandrel means when the pressure equalization plug means is retained in abutting engagement with the dog locking sleeve means;

first shear type releasing means releasably securing the pressure equalization plug means to the dog locking sleeve means, thereby preventing the flow of fluid through said plug, the first shear type releasing means releasing the pressure equalization plug means when a force having a first level of magnitude is applied to the pressure equalization plug means; and second shear type releasing means releasably securing the dog locking sleeve means to the sealing mandrel means, thereby retaining the dog locking sleeve means abutting the locking dog means, the second shear type releasing means releasing the pressure equalization plug means from the sealing mandrel means when a second force having a second level of magnitude greater than the force having a first level of magnitude is applied to said plug.

31. A removable plug for temporarily sealing the interior of a conductor pipe of an offshore platform or other similar annular member to prevent the flow of fluid therethrough, said removable plug comprising:

annular plug body housing means having an annular recess therein, said annular plug body housing means being secured to said conductor pipe or other similar annular member; and plug body means disposed within said annular plug body housing means, said plug body means comprising:

sealing mandrel means, the sealing mandrel means comprising:

annular member means having circular plug means therein, having sleeve means located in the circular plug means, having sealing member retaining means on the exterior thereof, and dog locking support means on the exterior thereof;

annular elastomeric inflatable packer means located on the sealing mandrel means for sealingly engaging the interior of said annular plug body housing means, the annular elastomeric inflatable packer means being retained on the sealing mandrel means by the sealing member retaining means thereon;

locking dog means pivotally mounted on the dog locking support means of the sealing mandrel means for retaining said plug from axial movement in at least one direction in said annular member;

dog locking sleeve means abutting the locking dog means in releasable engagement therewith;

pressure equalization plug means abutting the dog locking sleeve means in releasable engagement therewith, the pressure equalization plug means sealingly engaging the sleeve means located within the circular plug means of the sealing mandrel means when the pressure equalization plug means is retained in abutting engagement with the dog locking sleeve means;

first shear type releasing means releasably securing the pressure equalization plug means to the dog locking sleeve means, thereby preventing the flow of fluid through said plug, the first shear type releasing means releasing the pressure equalization plug means when a force having a first level of magnitude is applied to the pressure equalization plug means;

second shear type releasing means releasably securing the dog locking sleeve means to the sealing mandrel means, thereby retaining the dog locking sleeve means abutting the locking dog means, the second shear type releasing means releasing the pressure equalization plug means from the sealing mandrel means when a second force having a second level of magnitude greater than the force having a first level of magnitude is applied to said plug;

inflation assembly means having conduit means thereon sealingly engaging the interior of the annular elastomeric inflatable packer means, having connector means having check valve means therein, having on one end of the connector means quick disconnect plug means having attachment means thereon, and having cap means on the other end of the connector means;

attachment means secured to the pressure equalization plug means; and cable means having one end secured to the attachment means on the pressure equalization plug means while the other end is secured to the attachment on the quick disconnect plug means, the cable means having a length such that disengagement of the pressure equalization plug means from the sleeve means in the sealing mandrel means causes disengagement of the quick disconnect plug means by removal thereof from the inflation assembly means.

* * * * *